United States Patent [19]
Romoda et al.

[11] Patent Number: 4,769,228
[45] Date of Patent: Sep. 6, 1988

[54] METHOD OF REDUCING SULFUR DEPOSITION IN HYDROGEN SULFIDE EQUIPMENT

[75] Inventors: Iren Romoda, Concord; Robert V. Homsy, Orinda; Robert M. Ormiston, San Francisco, all of Calif.

[73] Assignee: Chevron Research Company, San Francisco, Calif.

[21] Appl. No.: 733,345

[22] Filed: May 13, 1985

[51] Int. Cl.[4] .............................................. C01B 17/05
[52] U.S. Cl. ............................................... 423/573 R
[58] Field of Search ........................ 423/573 R, 578 R

[56] References Cited

U.S. PATENT DOCUMENTS

| | | | |
|---|---|---|---|
| 3,937,795 | 2/1976 | Hasebe | 423/226 |
| 3,975,508 | 8/1976 | Richardson et al. | 423/224 |
| 4,049,776 | 9/1977 | Nicklin et al. | 423/226 |
| 4,325,936 | 4/1982 | Gowdy et al. | 423/226 |

Primary Examiner—John Doll
Assistant Examiner—Jeffrey Edwin Russel
Attorney, Agent, or Firm—S. R. La Paglia; E. A. Schaal

[57] ABSTRACT

A method is disclosed for reducing the sulfur deposition in the absorber of a Stretford process. In the Stretford process, hydrogen sulfide is removed from a gas stream by contacting the gas stream in an absorber with a circulating aqueous solution to convert the hydrogen sulfide to elemental sulfur particles, passing the solution containing the sulfur particles to a reaction vessel where the conversion of hydrogen sulfide to sulfur is completed, passing the solution containing the sulfur particles to an oxidizer, oxidizing the solution containing the sulfur particles in the oxidizer to form a regenerated solution, separating the sulfur particles from the regenerated solution, and recirculating the solution to the absorber. The sulfur deposition in the absorber is reduced by adding about 300 ppm of a hydroxyquinone compound, such as 1-hydroxyanthraquinone (1-HAQ); 1,2-dihydroxyanthraquinone (1,2-DHAQ); 1,8-dihydroxyanthraquinone (1,8-DHAQ); 1,2-dihydroxyanthraquinone 3-monosulfonic acid (1,2-DHAMA); 1,2,5,8-tetrahydroxyanthraquinone (1,2,5,8-THAQ); 1,4,5,8-tetrahydroxyanthraquinone (1,4,5,8-THAQ); 5-hydroxy 1,4-naphthoquinone (5-HNQ); or a mixture thereof, to the absorber.

8 Claims, 1 Drawing Sheet

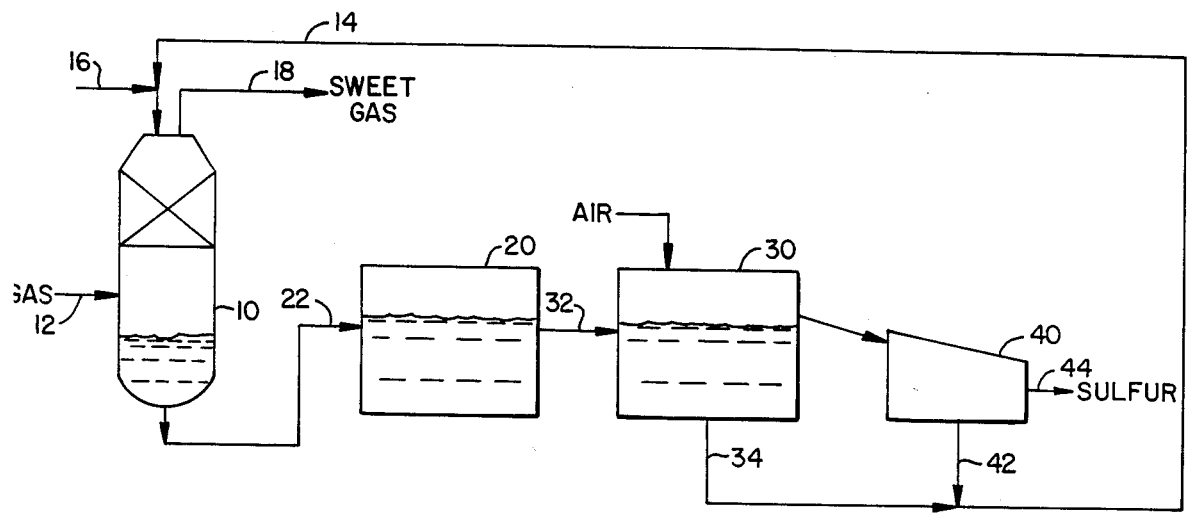

METHOD OF REDUCING SULFUR DEPOSITION IN HYDROGEN SULFIDE EQUIPMENT

BACKGROUND OF THE INVENTION

The present invention relates to the Stretford process, which removes hydrogen sulfide from a gas stream and recovers sulfur as a by-product. More particularly, the present invention relates to a method of reducing the sulfur deposition during the absorption step of the Stretford process.

Hydrogen sulfide is a common contaminant found in sour natural gas and in tail gases from petroleum refineries. This hydrogen sulfide is noxious because it has an offensive odor, because it is poisonous, and because it is explosive in air at concentrations of as low as 4.4 volume percent.

The noxiousness of hydrogen sulfide has led to laws that severely restrict the amount of hydrogen sulfide which may be exhausted into the atmosphere. In response to these laws, numerous processes have been developed to remove hydrogen sulfide from gases. The Stretford process is one of those processes. The Stretford process is described in three patents: U.S. Pat. Nos. 2,997,439; 3,030,889; and 3,097,926.

In one embodiment of the Stretford process, hydrogen sulfide is removed from a gas stream by a sixstep process. In the first step, the gas stream is contacted in an absorber with a circulating aqueous solution to partially convert the hydrogen sulfide to elemental sulfur particles. In the second step, the solution is passed to a reaction vessel to complete the reaction. In the third step, the solution containing the sulfur particles is passed to an oxidizer. In the fourth step, that solution is oxidized in the oxidizer to form a regenerated solution. In the fifth step, the sulfur particles are removed from the regenerated solution. In the sixth step, the clarified solution is recirculated to the absorber.

Unfortunately, in this embodiment, sulfur sometimes deposits in the absorber. These deposits cause fouling of the internals of the absorber.

SUMMARY OF THE INVENTION

The Applicants have found they can reduce that sulfur deposition by adding to the absorber in the first step an effective amount of one or more hydroxyquinone compound. Preferably, this effective amount of hydroxyquinone compound is from 0.05 to 400 ppm, but a more preferred effective amount is from 0.1 to 300 ppm, and the most preferred effective amount is from 0.1 to 200 ppm. The hydroxyquinone may be either 1-hydroxyanthraquinone (1-HAQ); 1,2-dihydroxyanthraquinone (1,2-DHAQ); 1,8-dihydroxyanthraquinone (1,8-DHAQ); 1,2-dihydroxyanthraquinone 3-monosulfonic acid (1,2-DHAMA); 1,2,5,8-tetrahydroxyanthraquinone (1,2,5,8-THAQ); 1,4,5,8-tetrahydroxyanthraquinone (1,4,5,8-THAQ); or a mixture thereof.

In one embodiment of the present invention, hydrogen sulfide is removed from a gas stream by first contacting the gas stream in an absorber with a circulating aqueous solution to convert the hydrogen sulfide to elemental sulfur particles. The sulfur deposition in the absorber is kept low by adding to the absorber from 0.1 to 200 ppm of at least one hydroxyquinone compound. The solution containing the sulfur particles is then passed to a reaction vessel where the conversion of hydrogen sulfide to elemental sulfur particles is completed, then the solution containing the sulfur particles is passed to an oxidizer where the solution is oxidized to form a regenerated solution, then the sulfur particles are removed from the regenerated solution and the clarified solution is recirculated to the absorber.

BRIEF DESCRIPTION OF THE DRAWINGS

The appended drawing is supplied as an aid to the understanding of this invention. This drawing is only exemplary, and it should not be construed as limiting the invention. The drawing is a schematic flow diagram illustrating the manner in which a hydrogen sulfide-containing gas is treated by one embodiment of the present invention.

DESCRIPTION OF THE PREFERRED EMBODIMENTS

In its broadest aspect, the present invention involves reducing the sulfur deposition in the absorber of a Stretford process by adding to that absorber an effective amount of at least one hydroxyquinone compound.

The Stretford process uses a circulating aqueous solution that contains anthraquinone disulphonic acid disodium salt (ADA) and ortho-, meta-, and pyro-vanadates of ammonium and alkali metals.

In the Stretford process, the gas stream is contacted with that circulating aqueous solution in an absorber. The hydrogen sulfide in the gas stream is oxidized by the solution to elemental sulfur particles, and the solution is reduced by the hydrogen sulfide. Examples of the types of reactions that can occur in the absorber are:

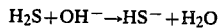
$$H_2S + OH^- \rightarrow HS^- + H_2O$$

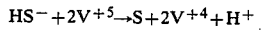
$$HS^- + 2V^{+5} \rightarrow S + 2V^{+4} + H^+$$

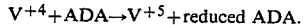
$$V^{+4} + ADA \rightarrow V^{+5} + \text{reduced ADA}.$$

Unfortunately, the hydrophobic sulfur particles sometimes deposit in the absorber. To reduce this sulfur deposition, at least one hydroxyquinone compound is added to the absorber in an effective amount. This hydroxyquinone must be selected from the group consisting of mono-, di-, tri-, or tetrahydroxyquinones that have one hydroxy group in the alpha position. Preferably, the effective amount of the hydroxyquinone compound is from 0.05 to 400 ppm, more preferably from 0.1 to 300 ppm, and most preferably from 0.1 to 200 ppm. Preferably, the hydroxyquinone compound is selected from the group consisting of 1-hydroxyanthraquinone (1-HAQ); 1,2-dihydroxyanthraquinone (1,2-DHAQ); 1,8-dihydroxyanthraquinone (1,8-DHAQ); 1,2-dihydroxyanthraquinone 3-monosulfonic acid (1,2-DHAMA); 1,2,5,8-tetrahydroxyanthraquinone (1,2,5,8-THAQ); 1,4,5,8-tetrahydroxyanthraquinone (1,4,5,8-THAQ); or a mixture thereof.

After the gas stream is contacted with the circulating aqueous solution, the solution and the sulfur particles are passed to a reaction vessel to complete the reaction, then the solution and the sulfur particles are passed to an oxidizer where either air or another oxygen-containing gas bubbles through the reduced solution to regenerate the solution by oxidation. The sulfur particles are then removed from the regenerated solution and the clarified solution is recirculated in the absorber. These sulfur particles can then be further processed in an autoclave.

With reference now to the drawing, hydrogen sulfide is removed from a process gas stream by passing the gas stream through Absorber 10 before the gas stream is finally allowed to vent to the atmosphere or to subsequent processing steps. The gas stream is passed into Absorber 10 through Conduit 12. Also passed into Absorber 10 are a circulating aqueous solution and a hydroxyquinone compound. The circulating aqueous solution, which contains ADA, sodium vanadate, and sodium carbonate, is passed into Absorber 10 through Conduit 14. The hydroxyquinone, which is 1-hydroxyanthraquinone (1-HAQ); 1,2-dihydroxyanthraquinone (1,2-DHAQ); 1,8-dihydroxyanthraquinone (1,8-DHAQ); 1,2-dihydroxyanthraquinone 3-monosulfonic acid (1,2-DHAMA); 1,2,5,8-tetrahydroxyanthraquinone (1,2,5,8-THAQ); 1,4,5,8-tetrahydroxyanthraquinone (1,4,5,8-THAQ); or a mixture thereof, is passed into Absorber 10 through Conduit 16. Inside Absorber 10, the gas stream is contacted with the circulating aqueous solution to convert the hydrogen sulfide to elemental sulfur.

The solution containing the sulfur particles is passed through Conduit 22 to Reactor 20, where the conversion of hydrogen sulfide to sulfur is completed. Substantially all of the hydrogen sulfide is absorbed from the gas by the circulating aqueous solution to form a clear gas that is substantially free of hydrogen sulfide. The clear gas is discharged through Conduit 18 to the atmosphere or is recovered. Sulfur deposition in the Absorber 10 is minimized by the presence of from 0.1 to 200 ppm of the hydroxyquinone compound in the Absorber 10.

The solution containing the sulfur particles is passed through Conduit 32 to Oxidizer 30, where the solution containing the sulfur particles is oxidized to form a regenerated solution. Then the sulfur particles are separated from the regenerated solution by a separation means such as a filter or a centrifuge in Separator 40. The solution from the oxidizer 30 is recirculated to Conduit 14 and ultimately the absorber by Conduit 34 and the solution from the Separator 40 is then recirculated to the Absorber 10 by Conduit 42. The sulfur particles are passed through Conduit 44 to further processing.

EXAMPLES

The invention will be further illustrated by the following examples which set forth particularly advantageous method and composition embodiments. While the examples are provided to illustrate the present invention, they are not intended to limit it.

Hydroxyquinones tested and found effective in our laboratory are the following:
1-hydroxyanthraquinone (1-HAQ);
1,2-dihydroxyanthraquinone (1,2-DHAQ);
1,8-dihydroxyanthraquinone (1,8-DHAQ);
1,2-dihydroxyanthraquinone 3-monosulfonic acid (1,2-DHAMA); and
1,2,5,8-tetrahydroxyanthraquinone (1,2,5,8-THAQ);
1,4,5,8-tetrahydroxyanthraquinone (1,4,5,8-THAQ).

Effective amounts of compounds tested:

| Compound | Concentration, ppm |
| --- | --- |
| 1-HAQ | 10-300 |
| 1,2-DHAQ | 0.1-100 |
| 1,8-DHAQ | 5-100 |
| 1,2-DHAMA | 1-100 |
| 1,2,5,8-THAQ | 0.1-100 |
| 1,4,5,8-THAQ | 0.1-100 |

During Pilot Plant testing, we monitored: (a) fouling rate of a packed column, and (b) relative sulfur size formed during the run.

(a) Fouling rate = total pressure drop increase in the column versus total testing time $\left(\frac{\text{inches H}_2\text{O}}{\text{hour}}\right)$.

(b) Relative sulfur size = size of sulfur agglomerates formed with additives relative to the size formed without additives.

The Pilot Plant test results were as follows:

| Additive | Concentration, ppm | Fouling Rate inch $H_2O$/hour | Relative Sulfur Size |
| --- | --- | --- | --- |
| 1-HAQ | 50 | N/A | 0.3 |
| — | — | 0.58 | 1 |
| 1,8-DHAQ | 100 | 0.11 | 0.3 |
| 1,2,5,8-THAQ | 5 | N/A | <0.1 |
| 1,2-DHAQ | 0.5 | 0.17 | 0.3 |
| $\begin{pmatrix}1,2\text{-DHAQ}\\1,2\text{-DHAMA}\end{pmatrix}$ | $\begin{pmatrix}0.5\\0.5\end{pmatrix}$ | 0.08 | 0.3 |
| 1,2-DHAMA | 1.0 | 0.16 | 0.8 |

We have discovered a synergistic effect between some hydroxyquinone compounds. 1,2-DHAQ in 0.5 ppm concentration reduces the fouling rate from 0.58 to $$0.17 \frac{\text{in. H}_2\text{O}}{\text{hour}}.$$

1,2-DHAMA in 5 ppm concentration reduces the fouling rate from 0.58 to $$0.16 \frac{\text{in. H}_2\text{O}}{\text{hour}}.$$

The two compounds applied together in 0.5 ppm concentration each act simultaneously and reduce the fouling rate from 0.58 to $$0.08 \frac{\text{in. H}_2\text{O}}{\text{hour}}.$$

While the present invention has been described with reference to specific embodiments, this application is intended to cover those changes which may be made by those skilled in the art without departing from the spirit and scope of the appended claims.

What is claimed is:

1. In a method for removing hydrogen sulfide from a gas stream comprising (1) contacting said gas stream in an absorber with a circulating aqueous solution to convert the hydrogen sulfide to elemental sulfur particles, (2) passing the solution containing the sulfur particles to a reactor where the reaction of hydrogen sulfide to sulfur is completed, (3) passing the solution containing the sulfur particles to an oxidizer, (4) oxidizing the solution containing said sulfur particles in said oxidizer to form a regenerated solution, (5) removing said sulfur particles from said regenerated solution, and (6) recirculating said clarified solution to said absorber;

The improvement comprising adding at least one hydroxyquinone compound selected from the group consisting of di-, tri-, or tetrahydroxyanthraquinones that have one hydroxy group in the alpha position to said absorber in an amount effective to reduce sulfur deposition in said absorber.

2. A method according to claim 1 wherein said effective amount of said hydroxyanthraquinone compound is from 0.05 to 400 ppm.

3. A method according to claim 2 wherein said effective amount of said hydroxyanthraquinone compound is from 0.1 to 300 ppm.

4. A method according to claim 3 wherein said effective amount of said hydroxyanthraquinone compound is from 0.1 to 200 ppm.

5. A method according to claim 1 wherein said hydroxyquinone compound is selected from the group consisting of 1,2-dihydroxyanthraquinone (1,2-DHAQ); 1,8-dihydroxyanthraquinone (1,8-DHAQ); 1,2,5,8-tetrahydroxyanthraquinone (1,2,5,8-THAQ); 1,4,5,8-tetrahydroxyanthraquinone (1,4,5,8-THAQ); or a mixture thereof.

6. In a method for removing hydrogen sulfide from a gas stream comprising (1) contacting said gas stream in an absorber with a circulating aqueous solution to convert the hydrogen sulfide to elemental sulfur particles, (2) passing the solution containing the sulfur particles to a reactor where the reaction of hydrogen sulfide to sulfur is completed, (3) passing the solution containing the sulfur particles to an oxidizer, (4) oxidizing the solution containing said sulfur particles in the oxidizer to form a regenerated solution, (5) removing said sulfur particles from said regenerated solution, and (6) recirculating said solution to said absorber;

The improvement comprising adding from 0.1 to 200 ppm of at least one hydroxyquinone compound to said absorber in an amount effective to reduce sulfur deposition in said absorber, wherein said hydroxyquinone compound is selected from the group consisting of: 1,2-dihydroxyanthraquinone (1,2-DHAQ); 1,8-dihydroxyanthraquinone (1,8-DHAQ); 1,2,5,8-tetrahydroxyanthraquinone (1,2,5,8-THAQ); 1,4,5,8-tetrahydroxyanthraquinone (1,4,5,8-THAQ); or a mixture thereof.

7. In a method for removing hydrogen sulfide from a gas stream comprising:
  (1) contacting said gas stream in an absorber with a circulating aqueous solution to convert the hydrogen sulfide to elemental sulfur particles;
  (2) passing the solution containing the sulfur particles to a reactor where the reaction of hydrogen sulfide to sulfur is completed;
  (3) passing the solution containing the sulfur particles to an oxidizer;
  (4) oxidizing the solution containing said sulfur particles in said oxidizer to form a regenerated solution;
  (5) removing said sulfur particles from said regenerated solution; and
  (6) recirculating said clarified solution to said absorber;
  the improvement comprising adding both 1,2,-dihydroxyanthraquinone (1,2-DHAQ) and 1,2,-dihydroxyanthraquinone 3-monosulfonic acid (1,2-DHAMA) to said absorber in an amount effective to reduce sulfur deposition in said absorber.

8. The method according to claim 7 wherein said effective amount of each of 1,2-DHAQ and 1,2-DHAMA is between 0.05 and 400 ppm.

* * * * *